June 17, 1952   W. ERNST   2,600,746
FLUID PRESSURE CONTROL VALVE
Filed Aug. 30, 1948   2 SHEETS—SHEET 1
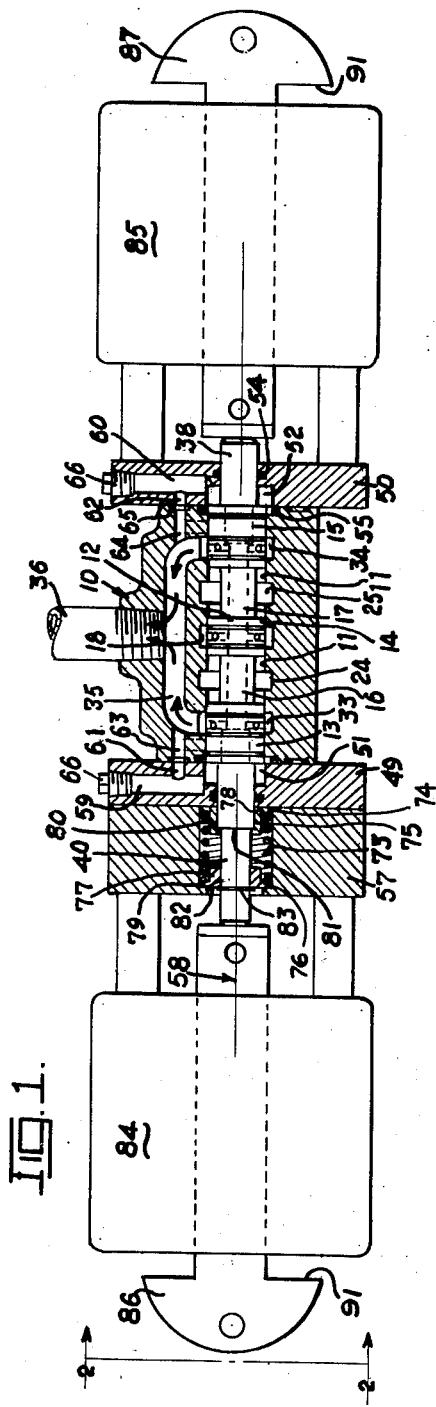
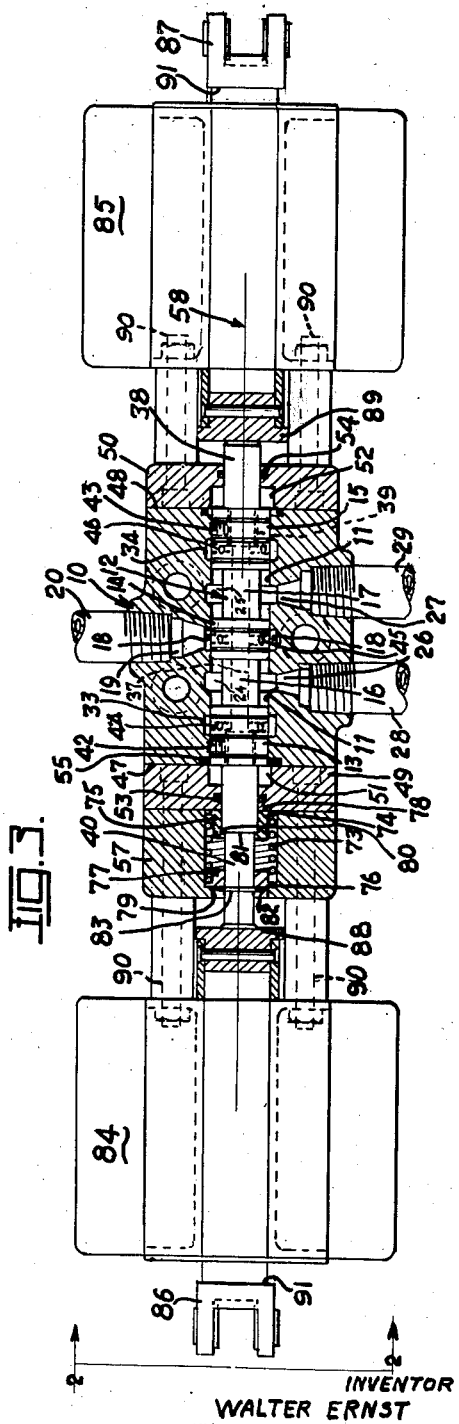
INVENTOR
WALTER ERNST
BY
Toulmin & Toulmin
ATTORNEYS

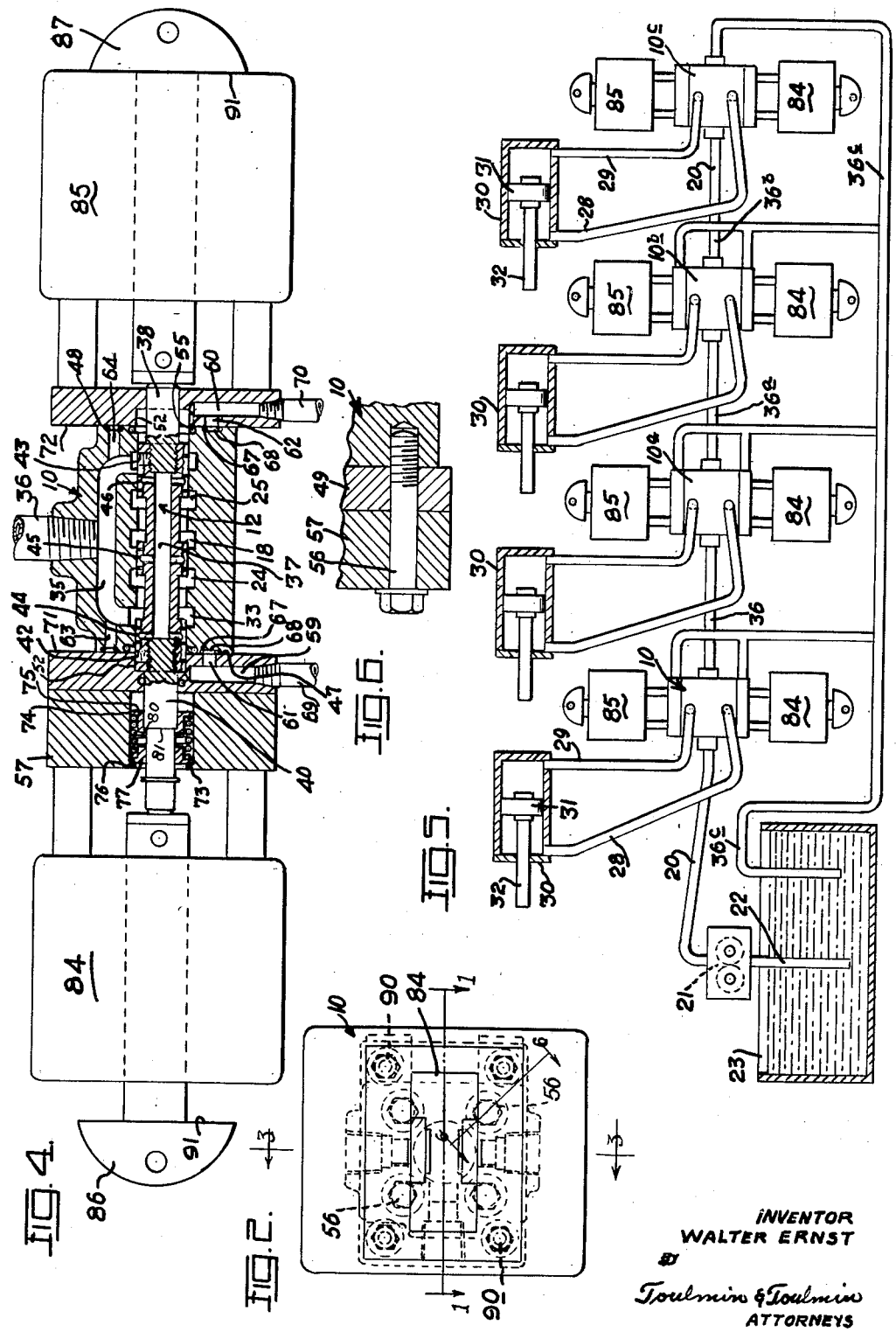

Patented June 17, 1952

2,600,746

UNITED STATES PATENT OFFICE 2,600,746

FLUID PRESSURE CONTROL VALVE

Walter Ernst, Dayton, Ohio, assignor, by mesne assignments, to The Thompson Grinder Company, Springfield, Ohio, a corporation of Ohio Application August 30, 1948, Serial No. 46,881

1 Claim. (Cl. 251—76)

This invention pertains to improvements in fluid pressure control valves and is particularly directed to improvements in solenoid operated reversing valves for hydraulic circuits.

One of the objects of this invention is to provide an improved and simplified valve readily adapted to the control of hydraulic circuits in which the exhaust discharge from the valve may in certain instances be under pressure while in other instances it may be discharged freely.

Still another object of this invention is to provide in a fluid pressure control valve, drain passageways for the packings of the valve plunger which may be selectively connected either to the main exhaust discharge circuit of the valve or into an independent exhaust discharge circuit, said selection being obtained by the orientation of the end head plates of the valve.

It is also another object of this invention to provide in a solenoid operated reversing valve a plunger arrangement having passageways in the spool diameter of the plunger such that when the valve is in neutral position, pressure supplied to the valve is automatically connected to the drain line circuit of the valve.

Further features and advantages of this invention will appear from a detailed description of the drawings in which:

Figure 1 is a plan view partly in section on the line 1—1 of Figure 2, showing the fluid pressure control valve containing the features of this invention.

Figure 2 is an end view of the valve indicated by the line 2—2 in Figures 1 and 3.

Figure 3 is a view partly in section on the line 3—3 of Figure 2.

Figure 4 is a view similar to Figure 1 showing the valve arranged for independent exhaust and energized with its plunger in one operative position.

Figure 5 is a circuit diagram showing the application of the valve in a typical fluid pressure control circuit to which it is particularly well adapted.

Figure 6 is a section on the line 6—6 of Figure 2.

As exemplary of applicant's invention there is shown a valve having a valve body 10 in which is provided a central bore 11 in which is slidably mounted the valve plunger 12 which has a series of three spool portions 13, 14 and 15 nicely slidably fitting in the bore 11. Annular groove portions 16 and 17 are provided between the aforementioned spool portions 13, 14 and 15. Associated with the bore 11 is a series of annular grooves comprising the groove 18 which is connected through a passageway 19 to a pressure supply line 20 connected to a suitable fluid pressure pump 21, Figure 5, which receives a supply of fluid through a suction line 22 from the fluid reservoir 23. A pair of annular grooves 24 and 25, Figure 3, are respectively connected through passageways 26 and 27 to conduits 28 and 29 connected to a fluid pressure motor or cylinder 30 having the usual piston 31 and piston rod 32 for actuating a device to be moved. Beyond the last mentioned grooves 24 and 25 are exhaust discharge grooves 33 and 34, Figure 1, connected together by a passageway 35 which in turn is connected to the discharge or drain line 36 of the valve.

The valve plunger 12 is provided with a central passageway 37 which is closed at one end by the valve plunger stem 38 tightly threaded in the valve plunger 12, and at the other end by the valve stem 40, also threaded in the valve plunger 12. Suitable set screws 42, 43 lock the respective valve stems 38 and 40 securely to the plunger 12 and thus tightly close off the ends of the passageway 37 therein. Extending from the periphery of each of the valve spools 13, 14, and 15 are the respective radial passageways 44, 45 and 46 connecting into the central passageway 37 so that when the valve plunger is in the neutral or central position locking out the cylinder supply lines 28 and 29, as best seen in Figure 3, fluid pressure from the line 20 passes through the passageway 19 and the annular groove 18 and inwardly through the radial passageways 45 to the central passageway 37. This passageway discharges the fluid pressure out through the radial passageways 44 and 46 into the annular grooves 33 and 34 to the passageway 35 and into the drain line 36 so that when the valve is in neutral or shut-off position, pressure from the pump 21 is relieved and allowed to discharge freely into the drain line circuit.

On each end of the valve body 10 is formed a flat surface 47 and 48 up against which fits the end plates 49 and 50. Each of these plates has a pocket 51 and 52 to receive the respective outer valve spools 13 and 15 as the valve plunger 12 is reciprocated to one position or the other from its neutral or central position as best seen in Figure 4. Suitable packing rings 53 and 54 engaging the valve stems 40 and 38, respectively, prevent fluid leakage past the spools 13 and 15 to these pockets 51 and 52. Suitable packing rings 55 also form a tight seal between these pockets and the valve body 10 so that no fluid may leak along the surfaces 47 and 48 between the members 49 and 50 and the valve body 10.

The end plates 49 and 50 are held to the valve body 10 by screws 56 as best seen in Figures 2 and 6, the bolts 56 passing only through the member 50 while in the case of the member 49 the bolts 56 also pass through the centering spring block 57. The screws 56 are so arranged that the plate members 49 and 50 may be rotated to a plurality of positions around the axis 58 of the valve so as to at one time connect the pockets 51 and 52 through the respective passageways 59 and 60 and the small passageways 61 and 62 to the mating passageways 63 and 64 in the valve body 10, Figure 1, for discharge into passageway 35 connected to the main discharge line 36 of the valve. Suitable packings 65 are provided in the valve body 10 to provide a fluid tight connection between the passageways 61—63 and passageways 62—64. Pipe plugs 66 are provided in the outer ends of the passageways 59 and 60. In this arrangement and positioning of end plates 49 and 50, drainage discharge from the ends of the valve plunger 12 is conducted to the main discharge line of the valve.

In instances where it is not practical to connect the drainage from the pockets 51 and 52 to the discharge line 36, as where back pressure exists in the line 36, the end plates 49 and 50 are rotated on the valve body 10 to the position shown in Figure 4 so that the passageways 61 and 62 are broken off at the packings 67 in the blind holes 68 in the valve body 10 and the pipe plugs in the passageways 59 and 60 are removed and suitable independent drain lines 69 and 70 are connected thereto. The passageways 63 and 64 in the valve body 10 are likewise blocked off by the surfaces 71 and 72 of the respective end plate members 49 and 50.

The valve plunger 12 is normally centered by a spring centering mechanism in the centering block member 57 comprising a compression spring 73 engaging the outer flange portion 74 of the bushing 75 and the flange portion 76 of the bushing 77. These flange portions 74 and 76 are normally respectively held against the surface 78 of the member 49 and the surface 79 of the member 57 as best seen in Figure 3. When the valve plunger is in the neutral position as shown in this figure, the surface 80 of the bushing 75 engages the shoulder 81 of the valve stem 40 while the outer face 82 of the bushing 77 engages the snap ring 83 fixed on the stem 40 of the valve.

The valve plunger 12 is actuated to either side of its neutral position, resiliently maintained by the spring 73, by a pair of actuator solenoids 84 and 85, each respectively having armatures 86, 87 with abutment plugs 88 and 89 respectively engaging the ends of the valve stems 40 and 38. These solenoids are rigidly bolted to the valve body 10 by the screws 90 connected to end plate members 49 and 50 as can best be seen in Figure 3.

As solenoid 85 is energized, its armature will be moved inwardly so that its surface 91 will bottom as best seen in Figure 4 to push the valve plunger 12 to the left as seen in this figure causing the bushing 75 to move with the valve stem compressing the spring 73 while the bushing 77 remains fixed, and the valve stem 40 moves through the bushing, pushing the armature 87 of the other solenoid 84 outwardly. This causes fluid pressure from the annular groove 18 to now enter the annular groove 25 and pass out through the line 29 to the cylinder 30 while discharge from this cylinder leads via the line 28 to the annular groove 24, which at this time is connected to the annular groove 33, and the fluid thus connected to the discharge line 36. Upon de-energizing of the solenoid 85, and the continued de-energization of the solenoid 84, the spring 73 will automatically return the valve plunger to neutral position. Energizing solenoid 84, while solenoid 85 remains de-energized, moves the valve plunger in the opposite direction to reverse the pressure and drainage connections to the cylinder 30.

Referring to Figure 5, there is shown a typical circuit in which this valve is particularly well adapted to function, both in cases where back pressure is met with in the exhaust discharge from the valve and where atmospheric drainage can be provided for the discharge of the valve. For instance in a sequence operated circuit as shown in Figure 5, the discharge from the line 36 of the first valve 10 may be connected to the pressure input of a second valve 10a and in turn the valve 10a may discharge through a line 36a to still another valve 10b which latter valve again may discharge through a line 36b to a valve 10c, this final valve 10c exhausting directly into a drain line 36c for return of the fluid to the fluid reservoir 23. In this arrangement, the valves 10, 10a, 10b would have their drainage lines from the valve pockets 51 and 52 for the ends of the valve plunger 12 connected as shown in Figure 4 so that the back pressure in the respective lines 36, 36a and 36b would not affect the operation of the valve. The valve 10c however is arranged as shown in Figure 1 eliminating the auxiliary drainage lines, so that the pockets 51 and 52 can be connected directly into the atmospheric drain line 36c.

It should be noted, referring to Figure 5 that when all of the solenoids of the valves 10, 10a, 10b are de-energized a straight through free passage of fluid is provided from the pump 21 into the drain line 36c so that the pump is under small load or back pressure when the entire valve system is de-energized or inoperative. It should be further noted that any one of the valves may be operated independently while the others are de-energized to get the desired full control to its respective cylinder to be operated. All the aforementioned features and operations may be obtained by the novel features set forth in this valve and with a very minimum of effort and readjustment of the parts to accompany an aforementioned desired end.

While the apparatus herein disclosed and described constitutes a preferred form of the invention, it is to be understood that the apparatus is capable of mechanical alteration without departing from the spirit of the invention and that such mechanical arrangements and commercial adaptations as fall within the scope of the appendant claims are intended to be included herein.

Having fully set forth and described this invention, what is claimed as new and desired to be secured by United States Letters Patent is:

In a valve: a valve body having a bore therethrough, flow passages in said body communicating with said bore and including an exhaust passage opening into the bore adjacent its opposite ends, said exhaust passage including ports opening out the end of said body a predetermined radial distance outwardly from the axis of said bore, a valve plunger having a central passageway and spaced spools on said valve plunger having radial passageways communicating said bore with said central passageway, said valve being reciprocably mounted in said bore for controlling said passages, end plates mounted on the ends of said body and having pockets therein registering with said bore, each pocket being constructed to receive one of said spools of said plunger when it is reciprocated into its opposite end positions, said plates having substantially radial channels therein extending from said pockets to the outer periphery of said plates for draining said pockets and the passageways of certain of said spools and said plunger central passageway, and additional passageways extending from said radial channels in the plates through the faces of the plates that are toward said valve body, said passageways being located radially outwardly from the axes of said pockets the aforementioned radial distance, whereby said plates can be positioned on said valve body so said passageways are in registration with said ports or out of registration therewith, means for clamping said plates to said valve body in their several positions, and sealing means carried by said valve body for sealing around the ends of said passageways for each position of said plates.

WALTER ERNST.

REFERENCES CITED

The following references are of record in the file of this patent:

UNITED STATES PATENTS

| Number | Name | Date |
|---|---|---|
| 2,145,977 | Foster | Feb. 7, 1939 |
| 2,180,817 | Nye | Nov. 21, 1939 |
| 2,200,824 | Herman | May 14, 1940 |
| 2,251,747 | Losey | Aug. 5, 1941 |
| 2,354,336 | Sloane | July 25, 1944 |
| 2,407,184 | Sparrow | Sept. 3, 1946 |